(12) United States Patent
Gittleman

(10) Patent No.: US 6,835,219 B2
(45) Date of Patent: Dec. 28, 2004

(54) RAPID STARTUP OF FUEL PROCESSOR USING WATER ADSORPTION

(75) Inventor: Craig S Gittleman, Brighton, NY (US)

(73) Assignee: General Motors Corporation, Detroit, MI (US)

( * ) Notice: Subject to any disclaimer, the term of this patent is extended or adjusted under 35 U.S.C. 154(b) by 772 days.

(21) Appl. No.: 09/853,398

(22) Filed: May 14, 2001

(65) Prior Publication Data

US 2002/0168306 A1 Nov. 14, 2002

(51) Int. Cl.[7] .............................. C01B 3/00; C01B 3/02; B01J 8/00; B01J 8/02; B01J 8/04
(52) U.S. Cl. ...................... 48/198.3; 422/188; 422/190; 422/194; 422/211; 422/222; 48/61; 48/127.9; 48/198.7
(58) Field of Search ................................ 422/187, 188, 422/190, 191, 193, 194, 211, 222; 48/61, 61 R, 89, 93–95, 119, 128, 127.9, 198.1, 211, 198.3, 212, 198.7, 215, 214 R, 214 A

(56) References Cited

U.S. PATENT DOCUMENTS 4,218,388 A * 8/1980 Schaper et al. ............. 518/702
6,692,545 B2 * 2/2004 Gittleman et al. ............ 48/128

* cited by examiner

Primary Examiner—Alexa Doroshenk
(74) Attorney, Agent, or Firm—Cary W. Brooks

(57) ABSTRACT

An apparatus and method is disclosed for rapidly heating fuel processor components during startup of a fuel cell powered vehicle. Rapid heating is achieved by placing a water adsorbent downstream of the fuel processor's primary reactor, which converts a hydrocarbon-based fuel to a hydrogen-rich fuel. In addition to hydrogen, the reformed fuel (reformate) includes carbon dioxide, carbon monoxide and water. The water adsorbent, which has a high heat of adsorption, produces heat as it adsorbs water in the reformate. Heat generated by water adsorption enhances the rate at which fuel processor components, such as a water-gas-shift reactor, reach their operating temperatures. In addition, water adsorption reduces water condensation on the water-gas-shift reactor catalyst. Once the fuel processor components attain their operating temperatures, water desorbs from the adsorbent and is available for converting carbon monoxide to carbon dioxide and hydrogen in the water-gas-shift reactor.

30 Claims, 2 Drawing Sheets

RAPID STARTUP OF FUEL PROCESSOR USING WATER ADSORPTION

TECHNICAL FIELD

This invention relates to a fuel processor for generating hydrogen gas by reforming hydrocarbon-based fuels, and more particularly, to a method and apparatus for heating fuel processor components, such as a water-gas-shift reactor, during startup of the fuel processor.

BACKGROUND OF THE INVENTION

A fuel cell is a device that converts chemical energy directly into electrical energy and heat. In perhaps its simplest form, a fuel cell comprises two electrodes—an anode and a cathode—separated by an electrolyte. During use, a fluid distribution system supplies the anode with fuel and supplies the cathode with an oxidizer, which is usually oxygen in ambient air. With the aid of a catalyst, the fuel undergoes oxidation at the anode, producing protons and electrons. The protons diffuse through the electrolyte to the cathode where, in the presence of a second catalyst, they combine with oxygen and electrons to produce water and heat. Because the electrolyte acts as a barrier to electron flow, the electrons travel from the anode to the cathode via an external circuit containing an electrical load that consumes power generated by the fuel cell. A fuel cell generates an electrical potential of about one volt or less, so individual fuel cells are "stacked" in series to achieve a requisite voltage.

Because fuel cells are more efficient than heat engines and can generate electricity with zero or near zero emission of pollutants, researchers have proposed replacing internal combustion engines in vehicles with fuel cells. Among the fuels that have been considered for vehicle applications, hydrogen ($H_2$) appears to be the most attractive. Hydrogen has excellent electrochemical reactivity, provides sufficient power density levels in an air-oxidized system, and produces only water upon oxidation. Despite these advantages, however, its use in vehicles is hampered by on-board storage difficulties and by the lack of an established retail supply network of $H_2$.

For these reasons, fuel cell engine designs often include a fuel processor, which employs steam reforming, autothermal reforming or partial oxidation to convert conventional hydrocarbon-based fuels, such as gasoline and methanol, to hydrogen. Most fuel processors include a primary reactor, a water-gas-shift (WGS) reactor, and a preferential oxidation (PrOx) reactor to generate "stack grade" $H_2$. In steam reforming the fuel processor supplies the primary reactor with water (steam) and a hydrocarbon-based fuel (e.g., gasoline, methanol, etc.), which react to form a mixture of $H_2$, carbon dioxide ($CO_2$), carbon monoxide (CO), and excess steam. Since CO would poison the anode catalyst, the fuel processor channels the primary reactor effluent (reformate) to the water-gas-shift (WGS) reactor, which contacts the gas mixture with a catalyst and water to convert most of the CO to $CO_2$ and $H_2$. Finally, the fuel processor converts residual CO to $CO_2$ in the PrOx reactor, which comprises a catalyst bed operated at temperatures (e.g., 150° C. to 250° C.) that promote preferential oxidation of CO by air with little attendant oxidation of $H_2$. In steam reforming, fuel gas leaving the PrOx reactor typically contains (in mole %) about 70% $H_2$, 24% $CO_2$, 6% nitrogen ($N_2$) and trace amounts (<20 ppm) of CO.

Autothermal reforming and partial oxidation share many features of steam reforming. For example, in one form of autothermal reforming, a portion of the hydrocarbon-based fuel may be burned or partially oxidized with oxygen or air within a reaction zone that is physically separate from the reforming reaction. Heat from the oxidation drives the endothermic conversion of water and the balance of the hydrocarbon-based fuel to $H_2$, $CO_2$, and CO in the reforming reaction zone. In another form of autothermal reforming, a portion of the hydrocarbon-based fuel is oxidized in the same reaction zone as the reforming reaction. Similarly, in partial oxidation, a fuel-rich mixture of the hydrocarbon-based fuel and air are reacted in the primary reactor, producing a gas mixture comprised mainly of $H_2$, $CO_2$, and CO. Autothermal reforming and partial oxidation also utilize WGS and PrOx reactors to reduce CO levels in the reformate stream leaving the primary reactor; the final reformate composition is about 42% $N_2$, 38% $H_2$, 18% $CO_2$, less than 2% methane ($CH_4$), and less than about 20 ppm CO. For further details of fuel processors for generating stack-grade $H_2$, see U.S. Pat. No. 6,077,620 entitled "Fuel Cell System with Combustor-Heated Reformer," which is herein incorporated by reference in its entirety and for all purposes.

One challenge facing developers of fuel cell engines is the ability to rapidly generate stack grade $H_2$ upon starting the fuel processor at ambient temperature (cold start conditions). Though many factors may affect fuel processor startup, it is particularly limited by the time required for the reactors to reach their operating temperatures. For example, a low temperature water-gas-shift reactor must reach about 200° C. before it can reduce CO in the reformate stream to levels low enough to be tolerated by the PrOx reactor and the fuel cell stack. A high temperature water-gas-shift catalyst must be even hotter (about 350° C.). Typically, the only heat available for raising the temperature of the water-gas-shift reactor is the sensible heat of the primary reactor effluent. This heat must be used to raise the temperature of the entire thermal mass downstream of the primary reactor, including the WGS reactor, the PrOx reactor and any heat exchangers.

Fuel processor startup is complicated by the presence of water vapor in the primary reactor effluent and the WGS reactor feed stream. Since water vapor may condense on the cold WGS catalyst, additional energy must be supplied during startup to vaporize any condensed water before the WGS catalyst is heated. Although the fuel processor may be run without water injection during startup to limit water vapor condensation, such practice may result in the primary reactor reaching excessive temperatures. As noted above, even if there is no water in the fuel processor feed at startup, the primary reactor generates water that may condense in the water-gas-shift reactor. Similarly, water may also condense on the cold PrOx catalyst during cold start, thus requiring additional energy to revaporize the condensed water.

Researchers have proposed several techniques for increasing heating rates of the fuel processor reactors, but each method has drawbacks. For example, the water-gas-shift reactor may be electrically heated at startup, but electric heating requires a secondary power supply that adds to the cost of the fuel processor. Alternatively, air or oxygen may be injected into the primary reactor effluent as it enters the water-gas-shift reactor, and an electrically heated catalyst (EHC) may be used to combust the $H_2$ and CO in the primary reactor effluent and subsequently heat the water-gas-shift catalyst. However, an EHC requires a secondary power supply, and air or oxygen injection may result in a loss of catalyst activity since many WGS catalysts are sensitive to oxygen. Non-pyrophoric water-gas-shift catalysts that "light off" or react in the presence of oxygen can generate sufficient heat to start the water-gas-shift reaction.

However, such catalysts contain costly precious metals and still need to reach a light-off temperature of about 130° C. to become active.

The present invention overcomes, or at least mitigates, one or more of the problems discussed above.

SUMMARY OF THE INVENTION

The present invention provides an apparatus and method for supplying additional heat to fuel processor components—including the water-gas-shift reactor—during startup of the fuel processor at ambient temperatures. The additional heat is supplied without expending secondary power, and is accompanied by the removal of water from the fuel processor's primary reactor effluent. The added heat allows the water-gas-shift reactor to reach its operating temperature more rapidly, which reduces the time needed for the fuel processor to generate stack grade $H_2$ during startup. In addition, by removing water from the primary reactor effluent, condensation of water vapor on the water-gas-shift reactor catalyst during startup is reduced or eliminated, which obviates the need to supply additional heat to vaporize the condensed water.

Therefore, one aspect of the present invention provides a fuel processor comprised of a primary reactor and a water-gas-shift reactor. The primary reactor is adapted to convert a hydrocarbon-based fuel to hydrogen, carbon dioxide, carbon monoxide and water. The water-gas-shift reactor contains a catalyst that is adapted to convert at least a portion of the carbon monoxide in the primary reactor effluent to carbon dioxide and hydrogen. The inlet to the water-gas-shift reactor communicates with the outlet of the primary reactor. The fuel processor also includes a water adsorbent that is located within a flow path between the outlet of the primary reactor and the outlet of the water-gas-shift reactor. During fuel processor startup, the water adsorbent generates heat by adsorbing at least a portion of the water in the primary reactor effluent. Useful water adsorbents include zeolites.

Another aspect of the present invention provides a method of heating a fuel processor during startup. The fuel processor includes a primary reactor that converts a hydrocarbon-based fuel to $H_2$, $CO_2$, CO, and $H_2O$, and a water-gas-shift reactor, which in the presence of a catalyst, converts at least some of the CO and $H_2O$ from the primary reactor to $CO_2$ and $H_2$. The method includes providing a water adsorbent within a flow path between an outlet of the primary reactor and an outlet of the water-gas-shift reactor. The water adsorbent generates heat during startup of the fuel processor by adsorbing at least a portion of the $H_2O$ from the primary reactor. Preferably, the heat generated is sufficient to raise the temperature of the water-gas-shift catalyst to a point where the catalyst can be lit-off by injecting oxygen or air into the water-gas-shift reactor. To maintain adsorption capacity following fuel processor shutdown, the method may also include purging water from a void volume adjacent the water adsorbent using a dry gas, e.g. from the interstices between palletized adsorbents, or from the cells of a monolithic adsorbent.

DESCRIPTION OF THE PREFERRED EMBODIMENT

Figure 1:
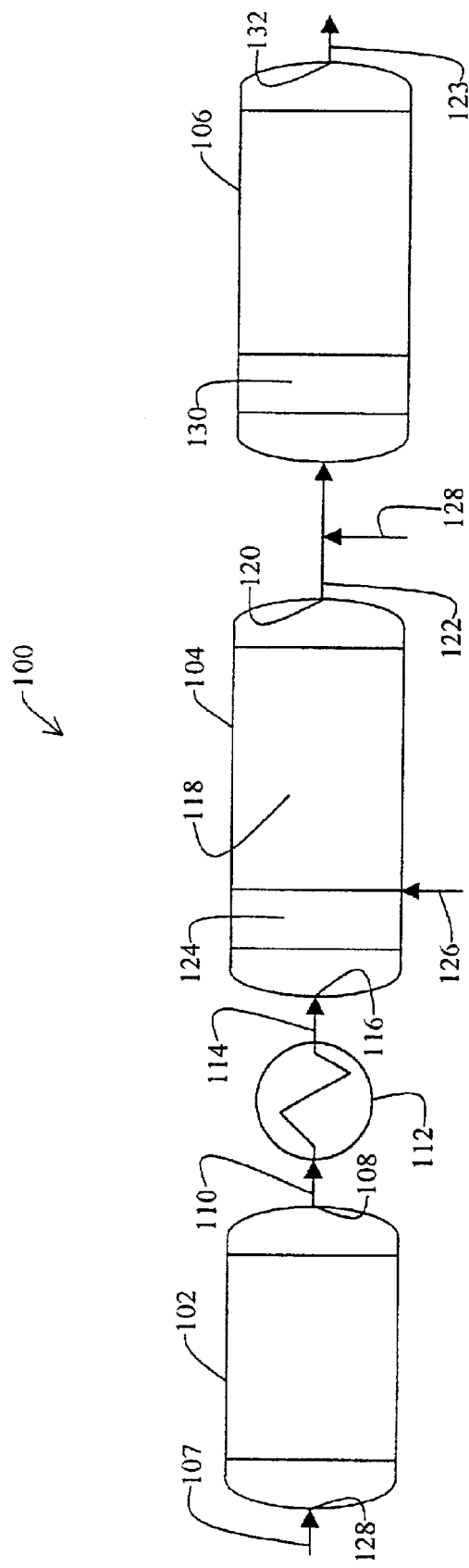
FIG. 1 is a schematic drawing of a portion of a fuel processor, which includes a water adsorbent.

FIG. 1 is a schematic drawing of a portion of a fuel processor 100, which converts one or more hydrocarbon-based fuels to stack grade $H_2$. The fuel processor 100 includes a primary reactor 102, a water-gas-shift (WGS) reactor 104 and an optional preferential oxidation (PrOx) reactor 106. During normal (post-startup) operation, one or more feed lines 107 provide the primary reactor 102 with a hydrocarbon-based fuel-gasoline, methanol, methane, propane and the like-as well as water (steam), and perhaps air. The primary reactor 102 converts the fuel, water and air (if present) to hydrogen-rich reformate, which exits the primary reactor 102 through an outlet 108 and an exhaust line 110. As described above, the primary reactor 102 effluent includes $H_2$, $CO_2$, CO, $H_2O$ and $N_2$ (from air if present).

The exhaust line 110 channels the primary reactor 102 effluent into a heat exchanger 112, which cools the reformate exiting the primary reactor during normal operation of the fuel processor 100. After the primary reactor 102 effluent passes through the heat exchanger 112, a second exhaust line 114 directs the reformate through an inlet 116 into the water-gas-shift reactor 104, where, in the presence of a WGS catalyst 118, most of the CO in the reformate is converted to $CO_2$ and $H_2$. The reformate exits the WGS reactor 104 via an outlet 120 and a third exhaust line 122, which routes the reformate to a PrOx reactor 106, which as discussed earlier, converts residual CO to $CO_2$ via preferential oxidation of CO by air or oxygen. A fourth exhaust line 123 transports the reformate from the PrOx reactor to the fuel cell stack (not shown). In other embodiments, the reformate exiting the WGS reactor 104 may be fed directly to the fuel cell stack. The fuel processor 100 may also include components for controlling temperature, pressure and flow rate of various process streams. Such components include valves, additional conduits (exhaust and feed lines), temperature and pressure sensors, heat exchangers, microprocessors, and the like.

As shown in FIG. 1, the fuel processor 100 includes a water adsorbent 124 located downstream of the primary reactor 102, but upstream of the water-gas-shift reactor catalyst 118. The heat generated from water adsorbing on the water adsorbent 124 heats the primary reactor 102 effluent, which helps the WGS reactor 104 attain its operating temperature more rapidly during fuel processor 100 startup. Depending on the catalyst 118 employed, the water-gas-shift reactor 104 typically must reach operating temperatures between about 200° C. and about 350° C. before it can reduce the CO concentration in the reformate to levels that the PrOx reactor and the fuel cell stack find acceptable. As noted above, in the absence of the water adsorbent 124 or other supplemental heat sources, the sensible heat of the primary reactor 102 effluent must raise the temperature of the entire thermal mass downstream of the primary reactor 102. This may lead to substantial time delays—thirty minutes or more—between the first delivery of the hydrocarbon-based fuel to the primary reactor 102 and the appearance at the fuel cell stack of hydrogen-rich reformate having the requisite CO concentration (less than about fifty ppm CO).

As noted earlier, the primary reactor 102 effluent contains water, which is used to convert CO to $CO_2$ in the WGS reactor 104. During fuel processor 100 startup, wet reformate from the primary reactor 102 contacts the water adsorbent 124, which adsorbs a substantial fraction of the water in the reformate. The adsorption process liberates heat, which raises the temperature of reformate upstream of the WGS catalyst 118. As reformate flows through the water-gas-shift reactor 104, it raises the temperature of the WGS catalyst 118, as well as other fuel processor 100 components (e.g., PrOx reactor) located downstream of the WGS reactor 104. The heating rate of the water-gas-shift catalyst 118 in the fuel processor 100 of FIG. 1 is much more rapid than if the water adsorbent 124 is absent.

In addition to heating the reformate, the water adsorbent 124 helps prevent water from condensing on the water-gas-shift catalyst 118 during startup. As noted earlier, one obstacle to rapidly heating the water-gas-shift catalyst 118 is water vapor condensing on relatively cold (ambient temperature) catalyst 118. Even if the fuel processor 100 is run without water injection at startup, water is produced by chemical reaction in the primary reactor 102. If the water vapor condenses on the water-gas-shift catalyst 118, then a portion of the sensible heat of the primary reactor 102 effluent must be used to vaporize the condensed water, which is then unavailable for heating the water-gas-shift catalyst 118.

Once the reformate and the water-gas-shift catalyst 118 reach their operating temperatures, the adsorbent 124 will adsorb little, if any water. Instead, water adsorbed during fuel processor 100 startup will desorb as the reformate attains its operating temperature. Water is desorbed in accordance with the principle of temperature swing adsorption in which a material's adsorption capacity decreases with increasing temperature. The reformate entrains the desorbed water, which can then react with CO to form $CO_2$ and $H_2$ in the WGS reactor 104.

As can be seen in FIG. 1, the water-gas-shift reactor 104 includes an optional feed line 126 that is located immediately downstream of the water adsorbent 124. During fuel processor 100 startup, the feed line 126 injects air (oxygen) into the water-gas-shift reactor 104. The WGS catalyst 118 promotes a rapid exothermic reaction of hydrogen and CO with oxygen. This rapid heat release allows the water-gas-shift reactor 104 to "light off" or quickly reach its normal operating temperature. Air or oxygen injection is appropriate for WGS catalysts 118 that are non-pyrophoric and insensitive to oxygen, including catalysts containing platinum or other precious metals. Catalyst light off is particularly useful for rapidly heating the WGS catalyst 118 when combined with water adsorption because many WGS catalysts 118 must reach a temperature of about 130° C. before they will light off in the presence of air.

The fuel processor 100 may also include a system for maintaining the adsorption capacity of the water adsorbent 124 between fuel processor 100 shutdown and subsequent cold startup. A useful system may include a source of dry gas (e.g., air). Following fuel processor 100 shutdown, the dry gas can be directed through the water-gas-shift reactor 104 to purge wet reformate from the void volume adjacent the water adsorbent 124. The system would likely include shutoff valves for sealing off the water-gas-shift reactor 104—i.e., for isolating the water adsorbent 124—and one or more controllers for regulating the shutoff valves and the flow of the purge gas.

In the embodiment shown in FIG. 1, the water adsorbent 124 is located within the water-gas-shift reactor 104. More generally, however, the water adsorbent can be located within a flow path between the outlet 108 of the primary reactor 102 and the outlet 120 of the water-gas-shift reactor 104. Thus, in other embodiments, a water adsorbent may be interspersed with the WGS catalyst 118 or housed within one or more separate flow-through cartridges or adsorbers (not shown) located downstream of the primary reactor 102. Although each cartridge adds thermal mass, its use would permit the fuel processor 100 to isolate the water adsorbent from other processor 100 components, and would minimize the amount of dry gas needed to purge the adsorber of water following fuel processor 100 shutdown.

The fuel processor 100 shown in FIG. 1 also includes a PrOx reactor 106 located downstream of the water-gas-shift reactor 104 for reducing CO levels in the reformate stream leaving water-gas-shift reactor to less than 50 ppm and preferably less than 20 ppm. The PrOx reactor 106 may comprise a single stage (isothermal operation) or multiple stages (isothermal or adiabatic operation) and may include devices for controlling oxygen (air) input 128. For a discussion of PrOx reactors and their control see U.S. Pat. No. 5,637,415 entitled "Controlled CO Preferential Oxidation," which is herein incorporated by reference in its entirety and for all purposes.

The fuel processor 100 may also include a second water adsorbent 130 that is located within a flow path between the outlet 120 of the water-gas-shift reactor 104 and an outlet 132 of the PrOx reactor 106. During fuel processor 100 startup, the second water adsorbent 130 generates heat by adsorbing at least a portion of the water in the water-gas-shift reactor effluent. This heat enables the PrOx reactor 106 to reach its operating temperature more rapidly than if there were no second water adsorbent 130 present. The composition of the second water adsorbent 130 can be the same as, or different than, the WGS reactor 104 water adsorbent 124.

Useful adsorbents 124 include materials that readily and reversibly adsorb water, while adsorbing comparatively less or none of the other reformate constituents. It is also desirable that the adsorbents 124 can withstand operating conditions (temperature, pressure, pH, etc.) within the fuel processor 100, and can tolerate mechanical stresses and vibrations that arise during vehicle motion. Suitable adsorbents 124 also exhibit relatively high heats of adsorption (i.e., greater than about 10 kcal/mole $H_2O$).

Suitable adsorbents 124 include zeolite molecular sieves having high water adsorption capacities and high heats of adsorption. Zeolites are crystalline aluminosilicates having a basic structural framework that can be viewed as a three-dimensional network of $SiO_4$ and $[AlO_4]^-$ tetrahedra linked by oxygen atoms. The structural framework encloses cavities and defines channels or pores that are substantially uniform in size within a specific zeolite. Cations, which compensate for the negative charge of the structural framework, occupy some of the cavities. These cations, which may be alkaline metals such as sodium or potassium, or alkaline earth metals such as calcium or magnesium, are the active sites within the zeolite on which the water molecules adsorb. Because of the uniformity of pore size, the zeolite molecular sieve will accept molecules of certain dimensions (e.g., $H_2O$), while rejecting larger molecules.

Useful zeolites should have molar ratios of silicon to aluminum less than about five. Such hydrophilic zeolites typically contain Group 1 and Group 2 metals as compensating cations. Moreover, the hydrophilic zeolites should have heats of adsorption greater than about 10 kcal/mole $H_2O$, and preferably greater than about 20 kcal/mole $H_2O$. Useful adsorbents include type A zeolites and type X and Y zeolites (FAU structure type) having heats of adsorption ranging from about 20 kcal/mole $H_2O$ to about 30 kcal/mole H₂O. Particularly useful zeolite molecular sieves include type 3A, 4A, 5A, 13X, Y, and similar materials.

The adsorbent 124 may also include zeolites having a crystalline lattice in which one or more elements other than aluminum are isomorphously substituted for some of the tetrahedrally coordinated $Si^{4+}$. Isomorphous substitution refers to replacing some (or all) of an original element of the zeolite structure (Si or Al) with a second (different) element. The second element should have similar cation radius and coordination requirements as the original element so that the same basic crystalline structure is maintained. In addition to aluminum, suitable substitutes include, without limitation, boron, iron, germanium, and gallium.

The adsorbents 124 may have the form of beads or extrudates, but preferably should be formulated into monoliths, foams, and the like, using methods known in the art, including hydrothermal synthesis. Hydrothermal synthesis generally includes contacting a porous support with zeolite precursors and an optional organic template (e.g., a tetraalkylamine). The zeolite precursors include silica, water, and a source of metal ions (e.g., $Al^{3+}$). Useful porous supports include refractory inorganic oxides, such as $\alpha$-, $\delta$-, $\gamma$-, and $\theta$-$Al_2O_3$, MgO, CaO, $Ca_2SiO_4$, BaO, $Ca_3SiO_5$, $ZrO_2$, $CeO_2$, $Cr_2O_3$, $La_2O_3$, $ThO_2$, $SiO_2$, $NaBSiO_4$, $TiO_2$, $MgAl_2O_4$, $MgCr_2O_4$, $ZnCr_2O_4$, $ZnAl_2O_4$, $CaSiO_3$, various silicates, clays, and the like. The zeolite precursors and organic template (if present) are allowed to permeate the porous support and are heated at a temperature sufficient to induce zeolite formation. The resulting zeolite layer is then calcined to stabilize the layer and to remove the organic template and any residual organic material.

As described above, the water adsorbent can be interspersed with the water-gas-shift reactor catalyst 118. In WGS reactors employing a fixed bed of catalyst particles, water adsorbent particles can be mechanically mixed with the WGS catalyst, and loaded into the reactor prior to use. Alternatively, in WGS reactors employing catalysts supported on monolithic supports, the water adsorbent and catalyst can be applied using techniques known in the art. Useful application techniques include without limitation, spraying, wash coat methods, and in-situ synthesis (e.g., sol gel techniques, hydrothermal synthesis, etc.), either alone or in combination. For a description of the use of wash coat methods to apply catalysts on monolithic supports, see U.S. Pat. No. 6,162,558 entitled "Method and Apparatus for Selective Removal of Carbon Monoxide," and U.S. Pat. No. 5,114,901 entitled "Ceramic Coating for a Catalyst Support," which are herein incorporated by reference in their entirety and for all purposes. The mass ratio of water adsorbent to water-gas-shift catalyst typically ranges from about 0.02 to about 0.20.

The following examples are illustrative and non-limiting and represent specific embodiments of the present invention. The examples demonstrate the use of zeolites to rapidly raise the temperature of a reformate stream via the heat released by water adsorption. One can thus achieve rapid heating of fuel processor components through proper selection of the water adsorbent, fuel processor hardware, and process conditions.

EXAMPLE 1

A pair of zeolites were contacted with a model reformate gas stream containing $H_2$, $N_2$, CO, $CO_2$ and 5 mole % $H_2O$. Contacting occurred in a 3.5-cm cylindrical column filled with 8×12 mesh beads of either a type 5A zeolite or a type 13X type zeolite. The zeolites were obtained from UOP and PQ Corporation under the trade names UOP 5A-HP and PQ Sieves 13X. Prior to each experimental run, the column was placed in an oven set at 80° C. and purged with dry $H_2$ or $N_2$ to remove any water adsorbed on the zeolite beads. A thermocouple was placed within the column about 2.5 cm downstream of the column inlet to monitor the reformate gas stream temperature as a function of time. During each experiment, the reformate gas was delivered to the column at a temperature of 80° C. and at a flow rate of 13.7 standard liters per minute. Throughout each experiment, the pressure at the column outlet was maintained at 30.3 psig and the column was kept inside an oven maintained at 80° C.

Figure 2:
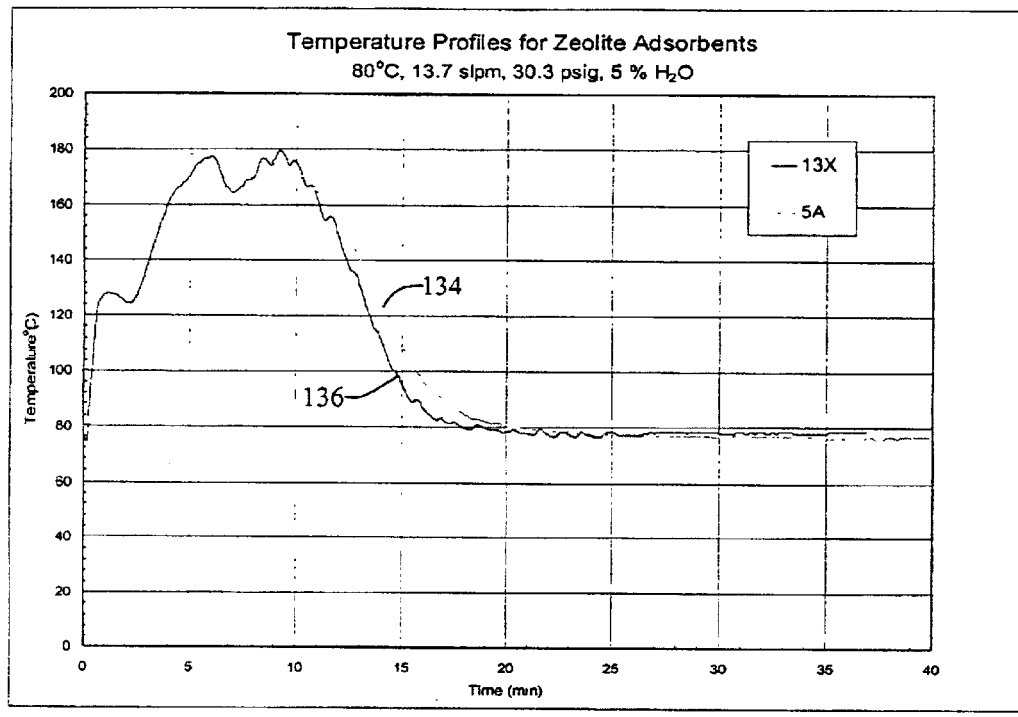
FIG. 2 shows temperature versus time profiles of a model reformate gas stream resulting from contact with 5A and 13X type zeolites.

FIG. 2 shows temperature versus time profiles 134, 136 of the model reformate gas stream resulting from contact with 5A and 13X type zeolites, respectively. The profiles 134, 136 show that the temperature of the reformate gas stream increases about 100° C. within about 5 minutes of contacting the zeolites. As noted above, the column was in thermal contact with an 80° C. oven during each experiment. If instead the column was well insulated (i.e., nearly adiabatic) the temperature rise due to water adsorption would be significantly more rapid, the peak temperature would be substantially higher, and the subsequent decline in temperature would be much slower. Increasing the amount of water in the reformate stream would likely produce a more rapid temperature rise during water adsorption.

EXAMPLE 2

The column used in Example 1 was filled with a 6-inch sample of a type 4A zeolite monolith, which was obtained from Munters. Thermocouples were placed at the column inlet and outlet to monitor the temperature of the gas entering and leaving the column as a function of time. A gas stream containing 30 mole % $H_2O$ and the balance $N_2$ was fed to the column at a volumetric flow rate of 25 standard liters per minute, which resulted in a space velocity through the column of 10,500 h$^{-1}$. During the experiment, the gas feed temperature was ramped from 30° C. to 200° C. over a 30-minute period and the pressure at the column outlet was maintained at 30 psig.

Figure 3:
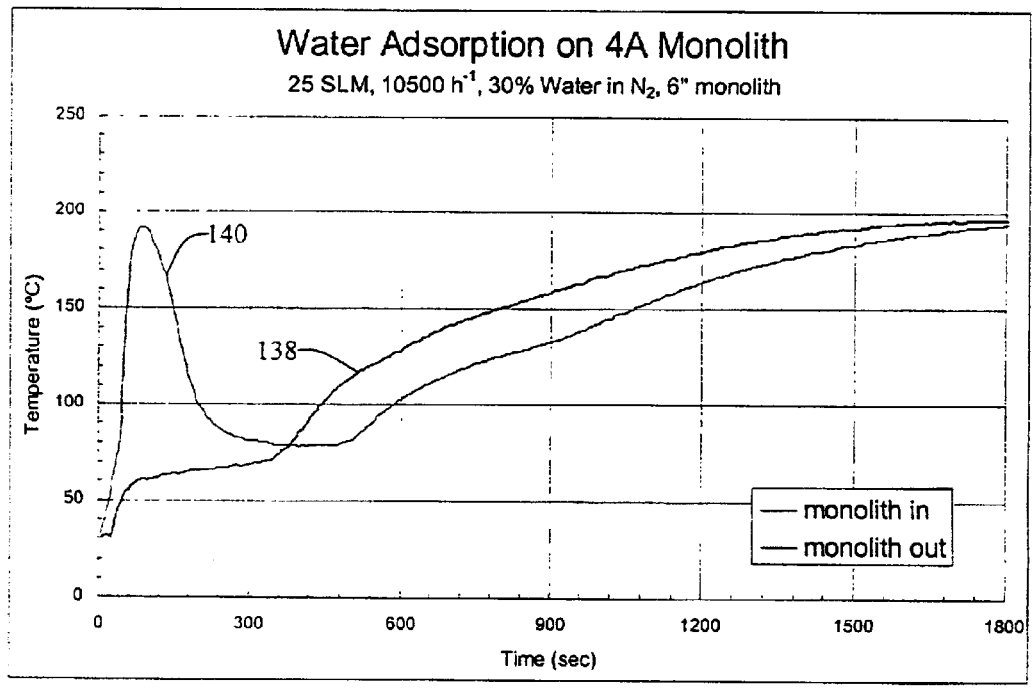
FIG. 3 shows temperature versus time profiles of a gas comprised of 30 mole % $H_2O$ and 70 mole % $N_2$ measured at the inlet and outlet of a column containing a type 4A zeolite monolith.

FIG. 3 shows temperature versus time profiles 138, 140 of the gas measured at the column inlet and outlet, respectively. FIG. 3 shows that the temperature of the gas exiting the column exceeded 190° C. in less than 2 minutes after starting the flow of gas through the column. It is reasonable to expect that the temperature rise would be even more rapid when using a smaller sample of the type 4A zeolite monolith. The 190° C. gas temperature attained in the experiment exceeds the 130° C. threshold temperature typically required to light off non-pyrophoric water-gas-shift catalysts.

The above description is intended to be illustrative and not restrictive. Many embodiments and many applications besides the examples provided would be apparent to those of skill in the art upon reading the above description. The scope of the invention should therefore be determined, not with reference to the above description, but should instead be determined with reference to the appended claims, along with the full scope of equivalents to which such claims are entitled. The disclosures of all articles and references, including patent applications and publications, are hereby incorporated by reference in their entirety for all purposes.

What is claimed is:

1. A fuel processor comprising:
   a primary reactor for converting a hydrocarbon-based fuel to hydrogen, carbon dioxide, carbon monoxide and water;

a water-gas-shift reactor having an inlet in fluid communication with an outlet of the primary reactor, the water-gas-shift reactor containing a catalyst that is adapted to convert at least a portion of the carbon monoxide from the primary reactor to carbon dioxide and hydrogen; and a water adsorbent located within a flow path between the outlet of the primary reactor and an outlet of the water-gas-shift reactor, the water adsorbent generating heat during startup of the fuel processor by adsorbing at least a portion of the water from the primary reactor.

2. The fuel processor of claim 1, wherein the water adsorbent is interspersed with the water-gas-shift reactor catalyst.

3. The fuel processor of claim 1, wherein the water adsorbent has a heat of adsorption of at least about 10 kcal/mole $H_2O$.

4. The fuel processor of claim 1, wherein the water adsorbent has a heat of adsorption of at least about 20 kcal/mole $H_2O$.

5. The fuel processor of claim 1, wherein the water adsorbent is a monolith.

6. The fuel processor of claim 1, wherein:
the mass ratio of water adsorbent to water-gas-shift reactor catalyst is about 0.02 to about 0.20.

7. The fuel processor of claim 1, further comprising a source of dry gas for purging water from a void volume adjacent the water adsorbent during fuel processor shutdown.

8. The fuel processor of claim 1, further comprising:
a preferential oxidation reactor having an inlet in fluid communication with the outlet of the water-gas-shift reactor, the preferential oxidation reactor containing a catalyst that is adapted to convert at least a portion of the carbon monoxide from the water-gas-shift reactor to carbon dioxide; and
a second water adsorbent located within a flow path between the outlet of the water-gas-shift reactor and an outlet of the preferential oxidation reactor.

9. The fuel processor of claim 1, wherein the fuel processor is a part of a fuel cell engine, the fuel cell engine comprising a fuel cell stack for generating electricity from hydrogen generated by the fuel processor.

10. A fuel processor comprising:
a primary reactor for converting a hydrocarbon-based fuel to hydrogen, carbon dioxide, carbon monoxide and water;
a water-gas-shift reactor having an inlet in fluid communication with an outlet of the primary reactor, the water-gas-shift reactor containing a catalyst that is adapted to convert at least a portion of the carbon monoxide from the primary reactor to carbon dioxide and hydrogen; and
a zeolite water adsorbent located within a flow path between the outlet of the primary reactor and an outlet of the water-gas-shift reactor, the zeolite water adsorbent generating heat during startup of the fuel processor by adsorbing at least a portion of the water from the primary reactor.

11. The fuel processor of claim 10, wherein the zeolite water adsorbent has a molar ratio of silicon to aluminum less than about five.

12. The fuel processor of claim 10, wherein the zeolite water adsorbent is a type A zeolite or has FAU structure.

13. The fuel processor of claim 10, wherein the zeolite water adsorbent has a crystalline lattice in which some or all of the silicon or aluminum have been isomorphously substituted with a different element.

14. The fuel processor of claim 10, wherein the zeolite water adsorbent is interspersed with the water-gas-shift reactor catalyst.

15. The fuel processor of claim 10, wherein the zeolite water adsorbent has a heat of adsorption greater than or about equal to 10 kcal/mole $H_2O$.

16. The fuel processor of claim 10, wherein the zeolite water adsorbent has a heat of adsorption greater than about 20 kcal/mole $H_2O$.

17. The fuel processor of claim 10, wherein the zeolite water adsorbent has the form of a monolith.

18. The fuel processor of claim 10, wherein:
the mass ratio of the zeolite water adsorbent to water-gas-shift reactor catalyst is about 0.02 to 0.20.

19. The fuel processor of claim 10, further comprising a source of dry gas for purging water from a void volume adjacent the zeolite water adsorbent during fuel processor shutdown.

20. The fuel processor of claim 10, further comprising:
a preferential oxidation reactor having an inlet in fluid communication with an outlet of the water-gas-shift reactor, the preferential oxidation reactor containing a catalyst that is adapted to convert at least a portion of the carbon monoxide from the water-gas-shift reactor to carbon dioxide; and
a second water adsorbent located within a flow path between the outlet of the water-gas-shift reactor and an outlet of the preferential oxidation reactor.

21. The fuel processor of claim 10, wherein the fuel processor is a part of a fuel cell engine, the fuel cell engine comprising a fuel cell stack for generating electricity from hydrogen generated by the fuel processor.

22. A method of heating a fuel processor during startup, the fuel processor comprising a primary reactor for converting a hydrocarbon-based fuel to hydrogen, carbon dioxide, carbon monoxide and water, and a water-gas-shift reactor having an inlet in fluid communication with an outlet of the primary reactor, the water-gas-shift reactor containing a catalyst that is adapted to convert at least a portion of the carbon monoxide from the primary reactor to carbon dioxide and hydrogen, the method comprising:
providing a water adsorbent located within a flow path between the outlet of the primary reactor and an outlet of the water-gas-shift reactor, the water adsorbent generating heat during startup of the fuel processor by adsorbing at least a portion of the water from the primary reactor.

23. The method of claim 22, further comprising providing a zeolite water adsorbent.

24. The method of claim 22, further comprising purging water from a void volume adjacent the water adsorbent with a dry gas during fuel processor shutdown.

25. The method of claim 22, further comprising introducing air or oxygen into the water-gas-shift reactor to light off the catalyst.

26. The method of claim 22, further comprising:
providing a second water adsorbent located within a flow path between the outlet of the water-gas-shift reactor and an outlet of a preferential oxidation reactor.

27. A method of starting-up a fuel processor comprising a primary reactor that converts a hydrocarbon fuel to an effluent comprising hydrogen, carbon dioxide, carbon monoxide and water, and a water-gas-shift reactor having a catalyst that promotes the water-gas-shift reaction of said carbon monoxide with water to produce more hydrogen and carbon dioxide, comprising the steps of: (a) positioning a water adsorbent adjacent said; (b) flowing said effluent through said adsorbent to adsorb said water on said adsorbent and release the heat of adsorption; (c) heating said catalyst with said heat of adsorption; and (d) introducing oxygen into the heated catalyst to light-off said catalyst and commence said water-gas-shift reaction.

28. A method according to claim 27 wherein said adsorbent has a heat of adsorption of at least about 10 kcal/mole $H_2O$.

29. A method according to claim 27 wherein said adsorbent is upstream of said catalyst, and said heat is carried into said catalyst by said effluent.

30. A method according to claim 27 wherein said adsorbent is interspersed with said catalyst.

* * * * *